United States Patent Office 2,843,630
Patented July 15, 1958

2,843,630

PROCESS FOR PRODUCING MONO CHLORO ACETYL CHLORIDE

Richard Norman Lacey and Alan Edward Blades, Hull, England, assignors to The Distillers Company Limited, Edinburgh, Scotland, a British company No Drawing. Application February 8, 1954
Serial No. 408,993

Claims priority, application Great Britain
February 12, 1953

5 Claims. (Cl. 260—544)

The present invention refers to the production of chloroacetyl chloride which compound is useful for the production of other commercially valuable compounds, such as chloroacetic acid and chloroacetamide.

The formation of chloroacetyl chloride by reacting kerene and chlorine in the vapour phase or in solution has already been referred to in the literature and it has been stated that the reaction proceeds smoothly in ether and that the yields reach 37%. It is also well known that ketene has a marked tendency to polymerise so that in most known reactions involving its use, relatively low temperatures are used, often below 10° C. Furthermore, it is well recognised that in reactions involving the addition of chlorine to an unsaturated system, low temperatures are advisable since use of higher temperatures gives rise to dehydrohalogenation and substitution reactions.

A primary object of the present invention is the embodiment of a process for the production of chloroacetyl chloride, which is free of the defects of the prior art processes. A further object of the invention is the realization of higher yields than have theretofore been obtained in a process for the production of chloroacetyl-chloride. A futher object of the invention is the embodiment of a process of the type in question which is not bound up with low temperature restrictions. Owing to the fact that the difference in the boiling points of chloroacetyl chloride and dichloroacetyl chloride amounts to only one or two degrees centigrade, separation of these compounds by distillation, when they are comprised among the reaction products, is virtually impossible. Moreover their chemical reactivities are similar so that chemical methods of separation are unknown. A further object of this invention is the embodiment of a method whereby chloroacetyl chloride is obtained not only in reasonable yield but substantially free from dichloroacetyl chloride.

According to the present invention, therefore, the process for the production of chloroacetyl chloride comprises reacting chlorine with a molar excess of ketene in the vapour phase at temperatures between 100° and 200° C.

The reaction is preferably carried out at temperatures between about 180° and 190° C. Since the reaction is strongly exothermic, adequate provision has to be made for the removal of heat in order to keep the temperature within the range and to prevent the reactants from igniting, giving rise to sooty decomposition products. A suitable way of controlling the temperature is to carry out the reaction in a tubular reactor having a large surface area for the removal of the heat of reaction. In general the ratio of the volume of the reaction zone to the heat transfer area should not be substantially more than 2.5 millimetres. Conveniently, the reactor may take the form of one or more relatively narrow tubes jacketed with a liquid, preferably under forced circulation for rapid heat transfer characteristics. Under such conditions suitable temperatures for the heat transfer liquid are between about 120° to 140° C.

The reactants are fed into the reactor utilising a molar excess of ketene which can be varied according to the desired freedom of the product from dichloroacetyl chloride. Thus when the ketene is present in a 50% or greater molar excess, the reaction mixture contains less than 5–6% of dichloroacetyl chloride, while if the excess is raised to 80% or more, the reaction mixture is substantially free from this contaminant. Chloroacetyl chloride is formed according to the reaction:

$$CH_2=CO + Cl_2 \rightarrow CH_2Cl.COCl$$

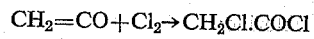

However considerable quantities of acetyl chloride are also formed by a side reaction but the separation of this valuable by-product can be achieved without difficulty by distillation.

A further method of carrying out the invention is to react a mixture of chlorine and hydrogen chloride, preferably having a molar content of free chlorine of about 60%, with a 20% or greater, suitably 20–30%, molar excess of ketene based on the chlorine and hydrogen chloride together. The hydrogen chloride reacts to form acetyl chloride according to the equation:

$$CH_2=CO + HCl \rightarrow CH_3COCl$$

Under such conditions the total acetyl chloride may amount to more than the chloroacetyl chloride produced, but the dichloroacetyl chloride production is again low and may be negligible.

If desired inert diluents such as nitrogen may be employed to moderate the reaction. Furthermore, a part only of one of the reactants may be fed into the beginning of the reaction zone, further quantities being added at intervals along the length of the reactor. Such a procedure helps to prevent local overheating and the consequent danger of ignition.

The following examples, in which all percentages are by weight unless otherwise stated, illustrate how the invention may be carried out in practice:

Example 1

2.43 moles of chlorine with 3.67 moles of ketene per hour (i. e. a 51% molar excess of ketene) are fed to the top of a vertical reactor consisting of glass tube 13 mm. in bore and 38 cms. in length surrounded by a jacket through which oil at 136° C. is circulated. The products issuing from the base of the tube are condensed and fractionated, the acetyl chloride being separated under atmospheric pressure and the remaining products under reduced pressure. Determination of dichloroacetyl chloride is made by hydrolysis to sodium oxalate using 10% by weight aqueous sodium hydroxide solution and precipitation of calcium oxalate which is separated, converted to free oxalic acid and titrated against potassium permanganate. The yield of chloroacetyl chloride is 40.0% by weight based on ketene and 60.5% by weight on chlorine. The yield of acetyl chloride is 13.6% by weight on ketene and the chloroacetyl chloride fraction contains 4.3% by weight of dichloroacetyl chloride.

Example 2

Employing the same apparatus with a jacket temperature of 137° C. and a 54% molar excess of ketene (2.7 moles/hour chlorine and 4.15 moles/hour ketene), the corresponding figures are—

Chloroacetyl chloride:
41.8% on ketene
64.1% on chlorine
Acetyl chloride: 20.2% on ketene
Dichloroacetyl chloride content: 6.2%

Example 3

When 1.90 moles/hour of chlorine and 3.04 moles/hour of ketene (a 60% molar excess of ketene) are fed to the reactor with the jacket temperature at 135° C., the figures are—

Chloroacetyl chloride: 37.8% on ketene
Acetyl chloride:
   60.5% on chlorine
   20.5% on ketene
Dichloroacetyl chloride content: 5.9%

Example 4

When 1.4 moles/hour of chlorine and 2.55 moles/hour of ketene (an 82% molar excess of ketene) are fed to the reactor with the jacket temperature at 131° C., the figures are—

Chloroacetyl chloride:
   29.1% on ketene
   53.0% on chlorine
Acetyl chloride: 18.0% on ketene
Dichloroacetyl chloride content: not detectable

Example 5

When 1.6 moles/hour of chlorine and 3.21 moles/hour of ketene (a 100% molar excess of ketene) are fed to the reactor with the jacket temperature at 133° C., the figures are—

Chloroacetyl chloride:
   25.2% on ketene
   50.6% on chlorine
Acetyl chloride: 18.8% on ketene
Dichloroacetyl chloride content: 0.5%

In contrast to the above examples, when 1.68 moles/hour of chlorine and 2.00 moles/hour of ketene (i. e. a 19% molar excess of ketene) is fed to the reactor with the oil jacket temperature at 133° C., the chloroacetyl chloride fraction contains about 25% of dichloroacetyl chloride. Similarly when 1.76 moles/hour of chloride and 1.89 moles/hour of ketene are passed into a liquid reaction medium comprising carbon tetrachloride together with the reaction products and held at 22–25° C., large amounts of dichloroacetyl chloride are again produced.

Example 6

A mixture of 0.80 mole/hour of hydrogen chloride and 2.34 moles/hour of chlorine (46.3 moles percent of free chlorine in the gas mixture) together with 3.79 moles/hour of ketene (i. e. a 20.7% molar excess of ketene on the hydrogen chloride and chlorine together) is fed to the reactor used in the preceding examples. The oil jacket temperature is maintained at 125° C. The yield of chloroacetyl chloride is 30.3% by weight on the ketene and 49.1% by weight on the chlorine. The yield of acetyl chloride is 47.8% by weight on ketene and the dichloroacetyl chloride content of the chloroacetyl chloride fraction is 6.7% by weight.

Example 7

When 0.54 mole/hour of hydrogen chloride and 2.10 moles/hour of chlorine (59.2 moles percent of free chlorine in the gas mixture) together with 3.27 moles/hour of ketene (i. e. a 20% excess of ketene on the hydrogen chloride and chlorine together) are fed to the reactor with the jacket temperature at 125° C., the corresponding figures are—

Chloroacetyl chloride:
   31.2% by weight on ketene
   48.6 by weight on chlorine
Acetyl chloride: 41.1% by weight on ketene
Dichloroacetyl chloride content: 5.1% by weight

Example 8

When 0.50 mole/hour of hydrogen chloride and 2.00 moles/hour of chlorine (60 moles percent of free chlorine in the gas mixture) together with 3.32 moles/hour of ketene (i. e. a 30% molar excess of ketene on the hydrogen chloride and chlorine together) are fed to the reactor with the jacket temperature at 125° C., the corresponding figures are—

Chloroacetyl chloride:
   31.9% by weight on ketene
   52.9% by weight on chlorine
Acetyl chloride: 36.1% by weight on ketene
Dichloroacetyl chloride content: 3.4% by weight

Example 9

When 0.72 mole/hour of hydrogen chloride and 2.93 moles/hour of chloride (60.6 moles percent of free chlorine in the gas mixture) together with 4.21 moles/hour of ketene (i. e. 15.3% molar excess of ketene on the hydrogen chloride and chlorine together) are fed to the reactor with the jacket temperature at 125° C., the corresponding figures are—

Chloroacetyl chloride:
   23.3% by weight on ketene
   33.3% by weight on chlorine
Acetyl chloride: 38.0% by weight on ketene
Dichloroacetyl chloride content: not detectable

Example 10

When 0.75 mole/hour of hydrogen chloride and 3.00 moles/hour of chlorine (60 moles percent of free chlorine in the gas mixture) together with 4.80 moles/hour of ketene (i. e. a 28% molar excess of ketene on the hydrogen chloride and chlorine together) are fed to the reactor with the jacket temperature at 127° C., corresponding figures are—

Chloroacetyl chloride:
   22.2% by weight on ketene
   35.5% by weight on chlorine
Acetyl chloride: 38.0% by weight on ketene
Dichloroacetyl chloride content: not detectable

We claim:

1. In a process for the production of monochloroacetyl chloride which comprises reacting chlorine in the vapor phase with ketene, the improvement wherein at least a 50 percent molar excess of ketene is employed and the reaction mixture is maintained at a temperature in the range from 100 to 200° C., whereby a product of monochloroacetyl chloride is obtained which contains less than 7 percent by weight dichloroacetyl chloride.

2. The process according to claim 1 wherein the reaction mixture is maintained at a temperature in the range from 180 to 190° C.

3. The process according to claim 1 wherein the reaction is carried out in a zone, the ratio of the volume of the zone to its heat transfer area being not substantially more than 2.5 mm.

4. The process according to claim 1 wherein an 80 percent molar excess of ketene is reacted with the chlorine whereby a product of monochloroacetyl chloride is obtained which is substantially free from dichloroacetyl chloride.

5. A process according to claim 3 wherein the reaction zone is jacketed with a heat transfer liquid maintained at a temperature in the range from 120° to 140° C.

References Cited in the file of this patent

UNITED STATES PATENTS

| | | |
|---|---|---|
| 2,184,963 | Steik | Dec. 26, 1939 |
| 2,688,634 | Pinkston et al. | Sept. 7, 1954 |
| 2,697,115 | Clower et al. | Dec. 14, 1954 |

OTHER REFERENCES

Staudinger: Die Ketene, page 92, vol. 1, March 1912.